Aug. 18, 1936.  H. H. COLE  2,051,519
IDENTIFICATION CAMERA AND CONTROL SYSTEM THEREFOR
Filed Dec. 16, 1932  5 Sheets-Sheet 3

Inventor
Harry H. Cole
By Lonane N. Adams
His Attorney

Aug. 18, 1936.   H. H. COLE   2,051,519
IDENTIFICATION CAMERA AND CONTROL SYSTEM THEREFOR
Filed Dec. 16, 1932   5 Sheets-Sheet 4

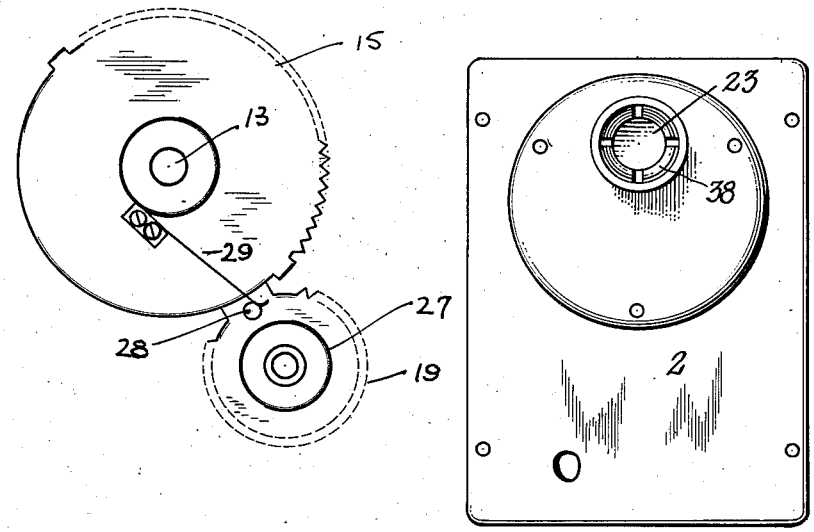
Fig 7  Fig 9
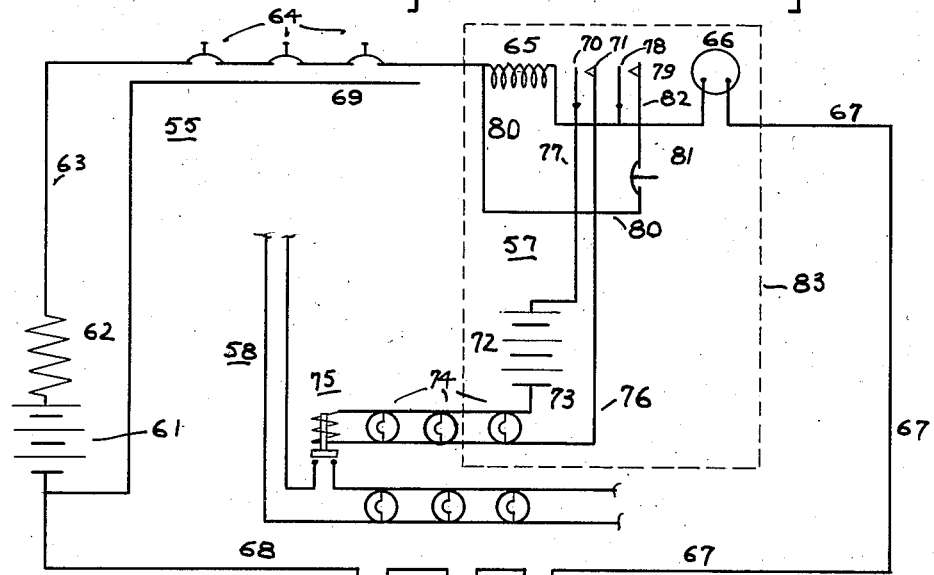
Fig 8
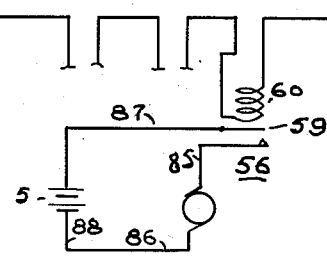

Patented Aug. 18, 1936

2,051,519

UNITED STATES PATENT OFFICE 2,051,519

IDENTIFICATION CAMERA AND CONTROL SYSTEM THEREFOR

Harry H. Cole, Eagle River, Wis., assignor of three-fourths to August H. Meyer, Oshkosh, Wis.

Application December 16, 1932, Serial No. 647,500

3 Claims. (Cl. 88—19.3)

The present invention relates to an identification camera and a control system therefor.

An object of the invention is to provide for a motor-driven identification camera operated by a self-contained source of power, and being independent of outside sources of energy.

Another object of the invention is to provide for an identification camera which is maintained inoperative by a source of energy exterior of the camera.

Another object of the invention is to provide for a camera which will operate in event of intentional or accidental manipulation or destruction of wiring exterior of the camera.

Another object of the invention is to provide for an efficient multi-speed shutter which operates silently and unobtrusively.

Another object of the invention is to provide for a shutter which operates at a substantially constant load upon its source of actuation.

Another object of the invention is to provide for a camera shutter which exposes the total picture area in a relatively short time interval.

Another object of the invention is to provide for a shutter which covers the lens at all times when the camera is inoperative.

Various other objects will be apparent from the following description and claims when read in connection with the accompanying drawings, in which:

Fig. 7 is a top plan view of the intermittent sprocket-driving gears and the cushioning device therefor.

Fig. 8 is a diagrammatic view of the control wiring system.

Fig. 9 is a view in front elevation of the camera.

Figure 1:
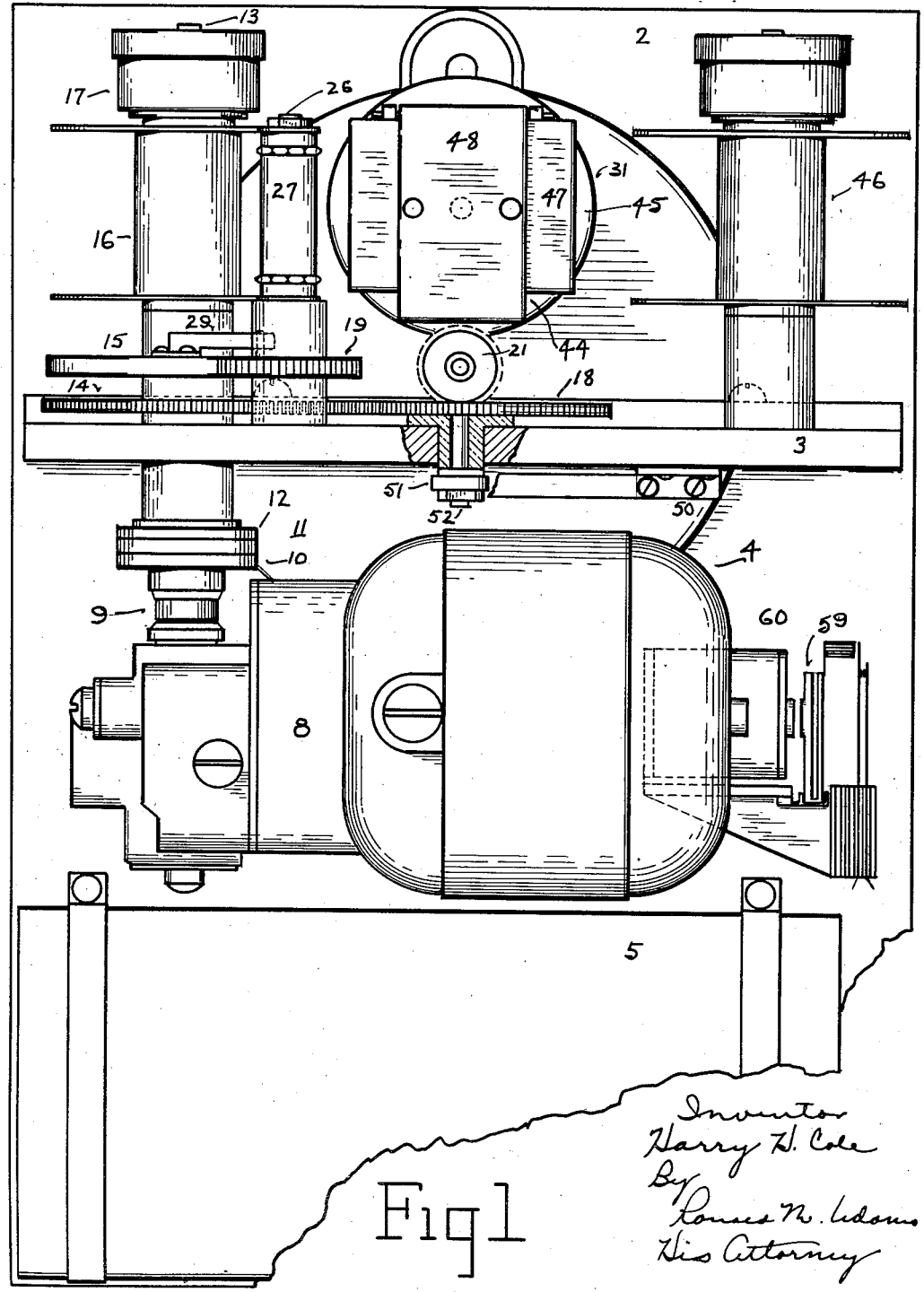
Fig. 1 is a view in rear elevation of an embodiment of the present invention.

The present camera is designed particularly as a means for identifying participants of holdups and for photographing suspicious persons not at the time committing overt acts.

Given a photograph of a participant in a bank holdup to circulate among the police of the nation, an outlaw is almost certain to be apprehended and organized gangs of criminals broken up. The camera described herein is possessed of features which particularly adapt it to adverse conditions under which such a camera must operate.

Referring now to the drawings, the rear case element 1 of the camera is adapted to be mounted in the wall of a bank or other building to be protected, forming a dust- and light-proof box when closed by the front face element 2 of the camera. The front element 2 serves as the base of the frame to which all working mechanism of the camera is attached. An angular bracket 3 extends rearwardly at right angles to the face 2 and is disposed about one third of the vertical distance from the top of the camera.

The bracket 3 serves the dual purpose of acting as a mount for the operating mechanism and as a light-tight baffle for maintaining the film in the upper chamber thus formed unexposed in event sparks are generated by the driving motor 4. A similar arrangement appears in the applicant's copending cases Serial Numbers 535,687 and 618,216, issued as Patents No. 1,932,691 on October 31, 1933 and 1,983,898 on December 11, 1934, respectively.

The motor 4 herein is described and shown as an electric motor for purposes of illustration. It will be understood that any constant speed motor may be used, such as a clock-spring motor with a governor, and motors of this type.

The motor 4 is controlled by circuits hereinafter described in detail, and is operated by current derived from a dry-cell battery 5 disposed beneath the motor within the camera case.

Figure 2:
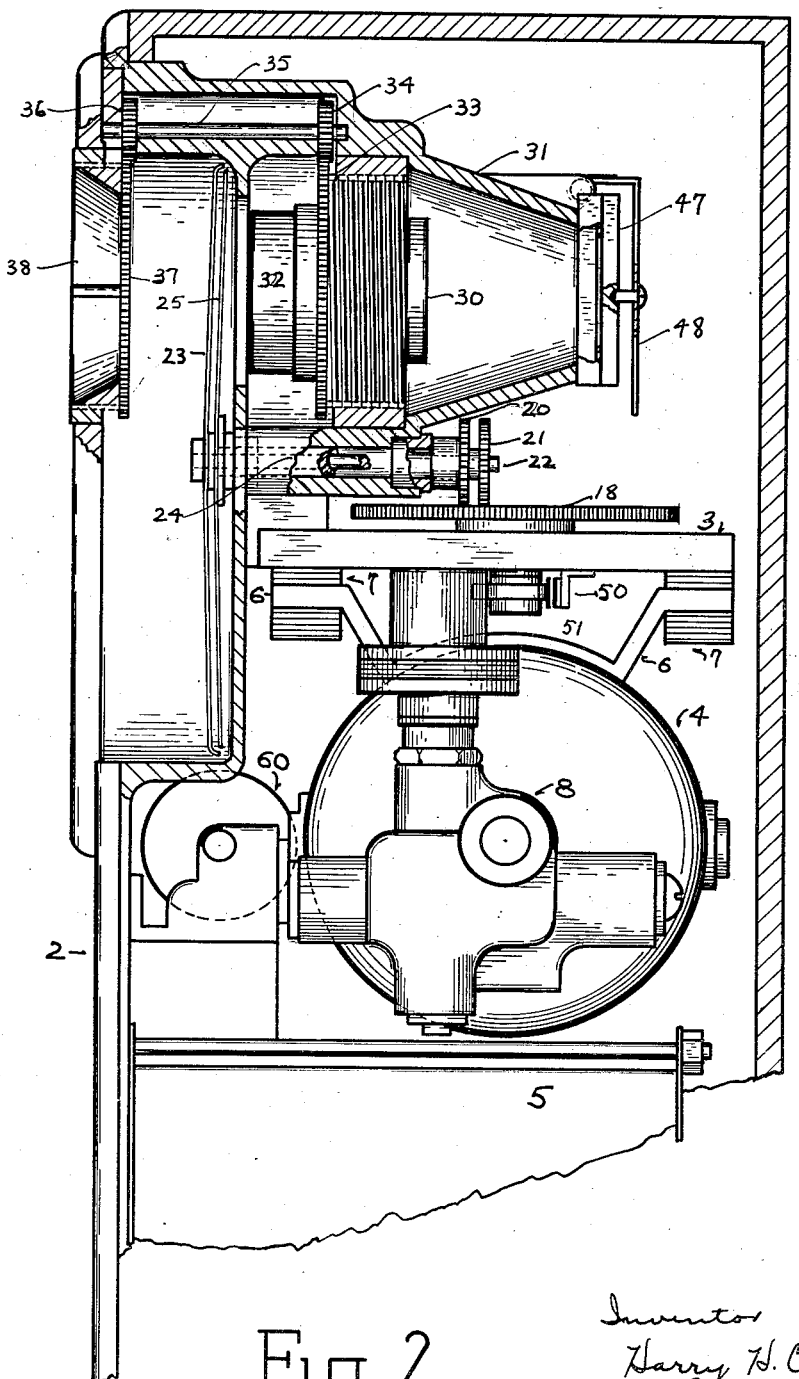
Fig. 2 is a view in side elevation of the camera, parts being broken away to reveal details of construction.

The motor 4 is suspended from the bracket 3 by hangers 6 which are insulated from the bracket by fibre or rubber strips 7 arranged on both sides of the legs of the hangers, as shown in Fig. 2.

The motor 4 is mechanically connected to a conventional type speed reducer 8, the drive shaft 9 of which extends vertically and terminates in the driving element 10 of a flexible coupling 11. The driven element 12 of the coupling is connected with the drive shaft 13 which extends vertically through the bracket 3.

The shaft 13 supports and drives the shutter drive gear 14, the intermittent sprocket drive-gear 15, the takeup spool 16, and terminates in a self-contained friction clutch 17, disposed to bear against the top surface of the takeup spool 16.

The gear 14 drives the crown gear 18. The gear 15 meshes with and drives the intermittent sprocket gear 19.

The crown gear is disposed to drive a pair of spur gears 20 and 21 for rotating the shutter discs, as will be more fully described hereinafter.

The spur gear 20 is disposed near the outer periphery of the crown gear 18. The spur gear 21 meshes with the 20-tooth crown gear 18, shown in Fig. 3, nearer its axis of rotation. While the number of teeth on the spur gears is optional in a drive of this kind, provided the proper ratio is maintained for a desired result, it has been found that the ratio of 15 teeth in the spur gear 20 to 20 teeth in the spur gear 21 gives the desired speed ratio between the two spur gears of 1 and ⅓ to 1, the purpose of which will be explained hereinafter.

In order that the spur gears 20 and 21 may drive concentric shafts and be driven by a common crown gear, the spur gear 20 is provided with stub teeth which reduces its actual diameter to that of the spur gear 21.

Further, in order that the stub teeth of the gear 20 may mesh with the teeth of the crown gear 18, the said stub-toothed gear 20 is placed at a distance from the gear 21 where the teeth mesh best. By the arrangement of gears described above, both spur gears are positively driven at different speeds by a common gear, and rotate and drive concentric shafts.

The gear 21 is pinned to a shaft 22 which drives the front disc 23 of the shutter. The gear 20 is connected to a sleeve 24, which operates outside the shaft 22, which sleeve drives the rear element 25 of the shutter. The rear element of the shutter, being operated by the gear 20 is therefore driven one and one third revolutions while the front element 23, which is driven by the gear 21, rotates one revolution. The purpose of the above described operation will be more fully described hereinafter.

The sprocket gear 19 rotates a vertical shaft 26, which drives the film sprocket 27. The gear 19 is provided with a pin 28 disposed near its outer edge. The drive gear 15 is provided with a flat spring 29 disposed to engage the pin 28 immediately prior to the engagement of the teeth of said intermittent gears after the pause cycle. The push and preliminary engagement of the spring against the pin tends to cushion the meshing of the teeth of the gears and prevents shock, breakage, and noise. The end of the spring 29 is turned (see Fig. 7) so that at the time when the strain of the actual engagement of the gears takes place, the tension on the spring is so reduced that the spring does not vibrate and make noise. At the time of disengagement, the strain has been entirely absorbed by the gear teeth. The fact that the spring is turned at its end also makes it possible to run the gears backwards while threading the film through the camera, without catching the spring on the pin and breaking one or the other.

The lens 30, through which the picture is projected, is placed within a lens tube 31 which is built as an integral part of the frame 2. The lens 30 is mounted in a lens barrel 32, the outer part of which is threaded into the lens tube 31. The lens barrel 32 is provided with a ring gear 33 rigidly attached thereto. The ring gear 33 meshes with a relatively small gear 34, which is pinned to the shaft 35, to the opposite end of which another gear 36 is attached. The gear 36 is rotated by means of a gear 37 which is connected to a focussing cone 38 disposed on the front face of the camera.

The lens barrel 32 may thus be rotated in the lens tube 31 by turning the focussing cone 38, and the camera set for a predetermined distance without removing any of the parts from the camera case.

Figure 5:
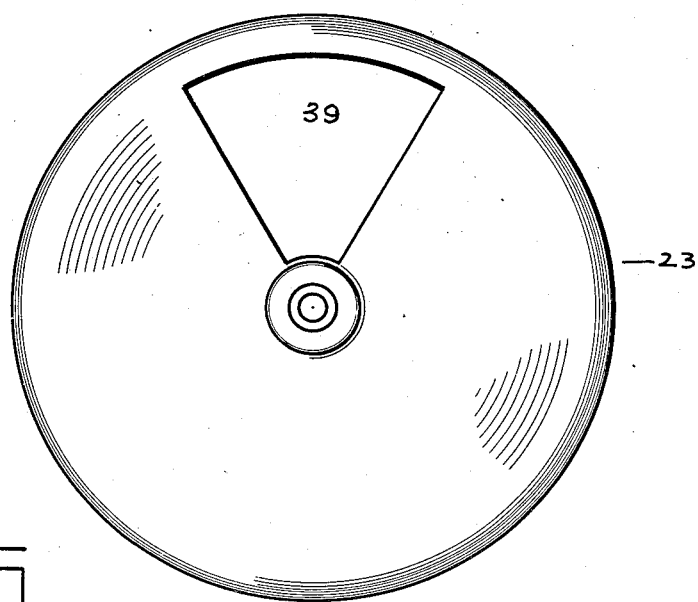
Figures 5 and 6 are views in front elevation of the shutter discs.
Figure 6:
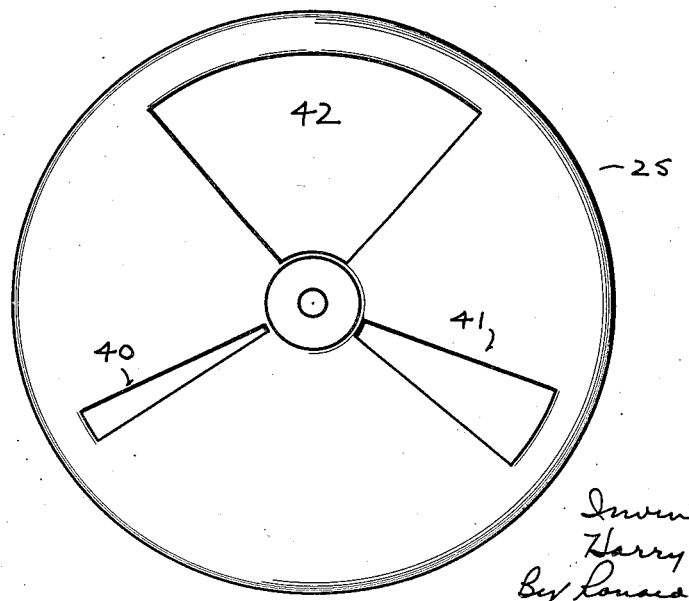

As previously stated, the shutter comprises a pair of rotatable discs 23 and 25. The front disc 23 is known as the selector disc, and is provided with a single fixed aperture 39, as shown in Fig. 5. The rear disc 25 is provided with three openings 40, 41, and 42 corresponding to the three different length exposures at which photographs are to be taken, as shown in Fig. 6. Three exposures of different length are found to be satisfactory for the particular uses to which this camera is put. It is not inconceivable that more or fewer exposures might be desirable for a particular use, whereupon the number of openings in the disc may be changed to suit the need.

In the present embodiment, the size of the three openings 40, 41, and 42 is governed by the length of exposure desired. The actual size of each is determined by the speed of rotation of the disc 25 past the lens 30. Thus if a half second exposure is desired, the aperture is of such dimension that it rotates past the lens in a half second, when the disc is rotating at operating speed.

The selector disc 23 is positioned before the disc 25 to select which of the openings therein will permit the passage of the photographic image to the film. Since, as has been discussed heretofore, the disc 25 rotates at one and one third times the speed of the front disc 23, the largest opening 42 in the rear disc 25 is 1 and ⅓ times as large as the single opening 39 in the selector disc 23. It also follows that, since the disc 25 rotates at the speed of 1 and ⅓ times that of the disc 23, the opening 39 will coincide with one of the openings 40, 41, or 42 once each revolution, and that there will be produced a succession of progressively varying exposures so long as both discs continue to rotate at their respective constant rates of speed.

It is essential to the successful operation of the camera, that the coincidence of the respective openings in the discs 23 and 25 occur directly before the lens. When the shutter is assembled, care is taken that the shutter discs are so set that the coincidence does occur before the lens.

In order to record the images which are flashed through the lens as the shutter rotates, a sensitized, perforated photographic film 43 is fed across the focal plane at the end 44 of the lens tube 31. A plate 45 of polished metal is secured to the end 44 of the lens tube 31, defining the focal plane, and being disposed to guide the film and hold it in proper focus.

The film 43 is supplied to the camera in a loading spool 46 and is threaded across the focal plane to the takeup spool 16.

In order to be assured that the film 43 lies flat at all times at the focal plane during exposure, a hinged pressure plate 47 is provided to hold the film firmly against the plate 45. Pressure is maintained against the plate 47 by a spring 48.

Figure 3:
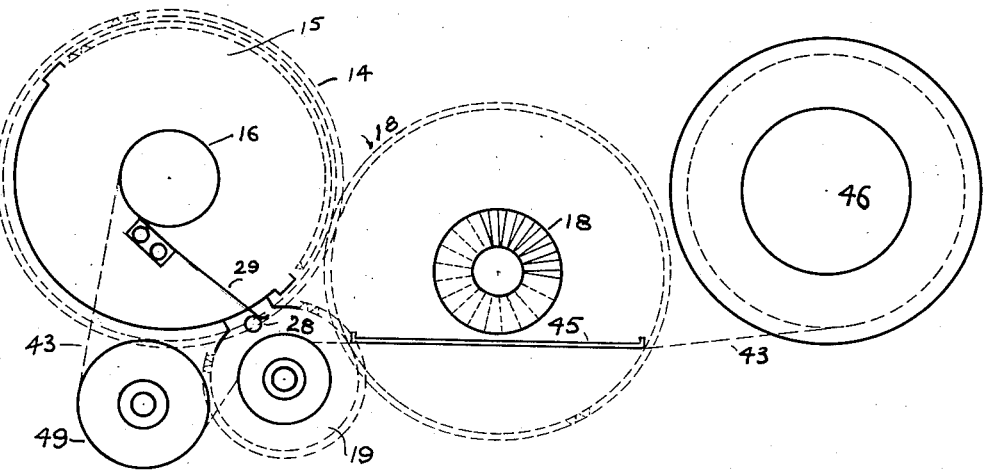
Fig. 3 is a diagrammatic view of the film driving mechanism of the camera.

In order to hold the film perforations in mesh with the teeth of the sprocket 27, an idler pulley 49 is provided to draw the film around a greater portion of the sprocket as shown in Fig. 3.

Figure 4:
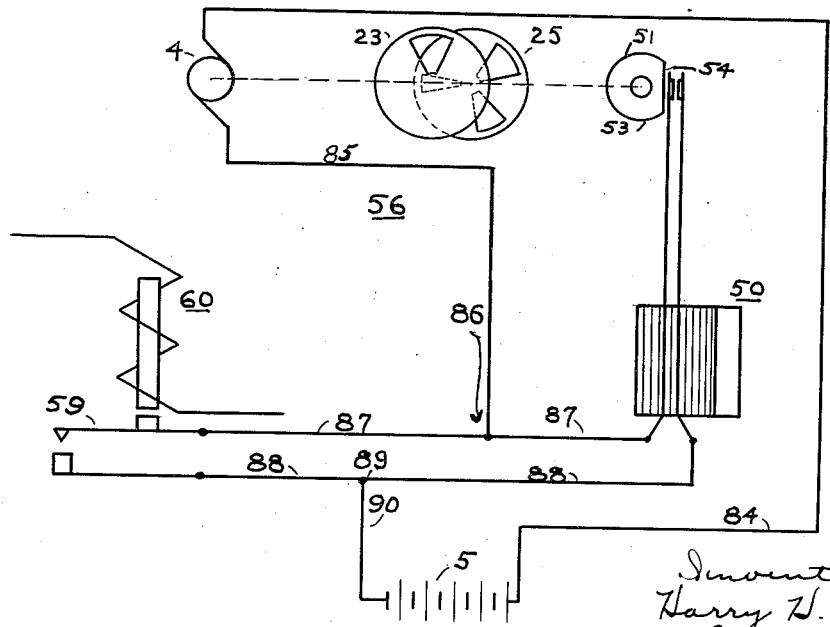
Fig. 4 is a semi-diagrammatic view of the interlock switch and the electrical circuits associated therewith.

In order to assure the stoppage of the shutter discs 23 and 25 in closed position to cover and protect the lens when the camera is not in use, an interlock switch 50, as shown in Fig. 4, is provided, by means of which the motor 4 which drives the shutter blades is maintained operative, though the motor switch is turned off, until said blades are closed. The interlock switch is operated by a cam 51 driven by a shaft 52 which is connected directly to and which supports the crown gear 18. While the shutter is open, the high side 53 of the cam 51 maintains the switch 50 closed, so that the motor circuit, more fully described hereinafter, is kept closed. When the shutter discs reach the closed position, the low side 54 of the cam 51 permits the switch 50 to open, to break the motor circuit, and to stop the shutter.

Referring now to Fig. 8 of the drawings, the control system comprises in general a supervisory circuit 55, independent and self contained motor circuits 56 in each camera of the system, a pilot light circuit 57 associated with the supervisory circuit 55, and an auxiliary illumination circuit 58 associated with the pilot light circuit 57.

The supervisory circuit 55 is normally closed and functions to hold a relay armature 59 of a relay 60 disposed within each camera in the system in open circuit position with respect to the motor circuit 56.

A dry battery 61 provides electricity for the supervisory circuit. Current from the battery 61 passes through a resistance element 62 of, for example, 200 ohms; thence through the lead 63, a series of switches and actuating devices 64, through a relay 65, the purpose of which will be hereinafter more fully explained. The current then passes through a milliammeter 66, through the lead 67, to the relay 60 of each camera in series, through a lead 68 back to the battery 61.

To detect employees or other agents who tamper with the wires or cut them, a shorting wire 69, placed in the conduit carrying the wire 63, is provided to short circuit the battery 61, shorting the supervisory circuit 55 out, and releasing the armature 59 of the relay 60, thus closing the motor circuit 56, of the cameras.

When the supervisory circuit 55 is opened by any of the various actuating devices 64, or is short circuited through the wire 69, the armature 70 of the relay 65 becomes deenergized and drops against the contact 71, thus closing the pilot light circuit 57. The pilot light circuit 57 comprises a battery 72, a lead 73, a plurality of incandescent lamps 74, a relay 75 for controlling the auxiliary illumination circuit 58, a lead 76 running to the contact 71, the armature 70, and a lead 77 running back to the battery 72.

The relay 75 serves to turn on the regular room illumination to provide additional light for photographic purposes in bad light.

The deenergization of the relay 65 causes the armature 78 to drop against the contact 79, shunting the current around the relay 65 through the lead 80, the reset switch 81, lead 82, back through the contacts 78 and 79.

Thus when the supervisory circuit 55 is broken, either by opening the circuit or short circuiting it, the pilot lights 74 turn on, indicating that the camera circuits have been closed and that some or all of the film has been used.

Even though the circuit 55 is restored by closing the open switch or repairing the short circuit, the pilot light circuit 57 remains closed, serving as a warning until the cameras have been inspected.

The only way the pilot lights can be turned off, and the relay 65 re-energized is by opening a locked cabinet and opening the re-set switch 81.

The circuits described herein safeguard the camera system against tampering, either by unscrupulous bank employees or others who might desire to put the cameras out of commission before a contemplated holdup.

The dotted line 83 indicates the cabinet and circumscribes the circuits and accessories contained therein.

The motor circuit 56 shown in Fig. 4, mentioned above, comprises the battery 5 contained in the camera case, a lead 84 from the battery to the motor 4, and a lead 85 from said motor to the terminal 86. The interlock switch and the relay 60 are connected in parallel by a lead 87 from the terminal 86, and a lead 88 from the terminal 89 and connecting with the opposite side of the relay 60 and the interlock switch 50. A lead 90 connects the terminal 89 to the battery 5, completing the motor circuit.

When the identification cameras are installed, they are so placed in the walls of the building that they command the view of the tellers' cages, doorways, the bank lobby, and all strategic positions at which there is likely to be activity in event of a holdup.

When anything untoward happens, one of the buttons or floortreads 64 is pressed, and the supervisor circuit is opened, causing the relays 60 to become deenergized and release the armature 59, closing the motor circuit within each of the cameras.

Parts of the supervisor circuit are contained within a control box 83 conveniently located. If the mechanism in the box is tampered with, or if wires are cut anywhere between the control box and the cameras, the supervisor circuit is opened and the cameras become operative. A bank robber who cuts wires or shoots up the control box in an effort to put the cameras out of commission is unintentionally engaging in self-portraiture.

When the various camera circuits are closed by the deenergized relay 60 of each camera, the motor 4 in each commences to run. The shaft 9 is driven by the speed reducer 8, causing the shaft 13 to rotate. The gear 14 drives the crown gear 18, causing the shutter spur gears 20 and 21 to drive the shutter discs 23 and 25.

The intermittent gear 15 drives the sprocket gear 19, causing the film sprocket 27 to draw the sensitized film 43 across the focal plane where the pressure plate 47 holds the film flat and in the focal plane.

Each time the film 43 stops, the shutter opens in front of the lens 30, making the exposure on a stationary film, thus preventing blur. When the shutter is fully closed, the film is drawn across the focal plane to move fresh and unexposed film into place for the next exposure.

The lens 30 is one of constant aperture, its only adjustment being that of focus. Focussing is accomplished by rotating the focussing cone 38 in the front face of the camera in the desired direction, which rotates the ring gear 37 on said cone, which rotates the gears 36, the shaft 35, the gear 34, and the ring gear 33 on the lens barrel, moving the lens 30 to focus it.

If, at this juncture, the supervisor circuit is closed, the armature 59 is attracted to the coil of the relay 60 opening the motor circuits in each of the cameras. If, at the time the supervisor circuit is closed, the shutter discs 23 and 25 happen to be in open position, the cam 51 lies in a position to hold the interlock switch 50 closed, maintaining the motor circuit long enough for the motor to rotate the discs to closed position. As will be seen from Fig. 4 of the drawings, the interlock switch 50 is wired in parallel with the relay 60 in the motor circuit, so that even though the relay 60 opens the motor circuit, the interlock switch maintains the circuit so long as the shutter discs are open. When the discs reach the closed position, the cam rotates to the position shown in Fig. 4, the switch opens and the motor stops.

It will be understood that various modifications of the present camera may be used and that the foregoing description is illustrative only.

I claim:

1. In an identification camera, a shutter comprising a pair of rotatable discs disposed on the same axis, one of said discs having a plurality of radial slots of different widths for governing the length of the successive photographic exposures, the other of said discs having one slot of such a dimension as to rotate past the lens in a time corresponding to that of the largest slot in the first mentioned disc, said discs being disposed for independent rotation on the same axis, means for rotating the discs at different predetermined constant relative speeds to cause the respective slots of the multi-slotted disc to coincide in succession with the single slot of the other disc at a point before the lens of the camera.

2. In an identification camera, in combination, a lens, a rotary shutter comprising a disc having a single aperture and a disc having a plurality of apertures each of different size, said discs being capable of independent rotation, shafts for operating said shutter discs, gears of different pitch on the said shafts driven by a common gear for rotating the respective shafts at different predetermined speeds to cause the single aperture of the one disc to register before the lens with each of the apertures in the other disc, in succession, to produce a plurality of varying photographic exposures.

3. In a motor driven camera, a lens, a rotary multi-disc shutter, one of said discs having a plurality of open slots of predetermined size for regulating photographic exposures, and the other of said discs having a single open slot, means for rotating said discs at such different relative speeds as to cause the single slot of one disc to register with each of the slots in the other disc before the lens of the camera successively and at predetermined time intervals, shafts for rotating said discs, a motor for operating said shutter disc shafts, a camshaft and cam rotated by said motor, said cam disposed to assume a characteristic position when said open slots have registered before the lens of the camera, an electric circuit controlling said motor, and an electric switch in the motor circuit disposed to be opened and closed by said cam, said cam being pre-set to maintain the switch closed while the shutter slots are registered before the lens of the camera, and to open the switch when the shutter is closed.

HARRY H. COLE.